(12) United States Patent
Chou et al.

(10) Patent No.: US 8,873,255 B2
(45) Date of Patent: Oct. 28, 2014

(54) POWER SUPPLY AND STARTUP CIRCUIT THEREOF

(71) Applicant: Excelliance MOS Corporation, Hsinchu County (TW)

(72) Inventors: Hung-Che Chou, Hsinchu County (TW); Fu-Chun Huang, Hsinchu County (TW); Pao-Chuan Lin, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 140 days.

(21) Appl. No.: 13/754,915

(22) Filed: Jan. 31, 2013

(65) Prior Publication Data
US 2014/0097822 A1  Apr. 10, 2014

(30) Foreign Application Priority Data

Oct. 5, 2012 (TW) .............................. 101219352 A

(51) Int. Cl.
| | |
|---|---|
| H02M 1/36 | (2007.01) |
| H02M 7/00 | (2006.01) |
| H02M 1/44 | (2007.01) |
| G05F 3/04 | (2006.01) |
| H02M 7/02 | (2006.01) |
| H02M 7/06 | (2006.01) |
| H02M 1/32 | (2007.01) |

(52) U.S. Cl.
CPC .. *G05F 3/04* (2013.01); *H02M 7/06* (2013.01); *H02M 7/00* (2013.01); *H02M 2001/322* (2013.01); *H02M 1/44* (2013.01); *H02M 1/32* (2013.01)
USPC .......................................................... 363/49

(58) Field of Classification Search
USPC ............................ 363/49, 81, 84, 89; 323/901
See application file for complete search history.

(56) References Cited

U.S. PATENT DOCUMENTS

| 8,698,474 B2* | 4/2014 | Yang et al. ..................... 323/287 |
| 2010/0309694 A1 | 12/2010 | Huang et al. |
| 2011/0176341 A1 | 7/2011 | Huang |
| 2011/0305051 A1 | 12/2011 | Yang et al. |
| 2012/0287685 A1* | 11/2012 | Fahlenkamp ................... 363/49 |

* cited by examiner

*Primary Examiner* — Gary L Laxton
(74) *Attorney, Agent, or Firm* — Jianq Chyun IP Office

(57) ABSTRACT

A power supply and its startup circuit are provided. The startup circuit includes a first transistor, a bias resistor, a pull-down switch, a voltage detector, and a discharging path generator. A first end of the first transistor receives alternating current (AC) input power. The bias resistor is serially coupled between a second end and a control end of the first transistor. The pull-down switch is turned on or turned off according to a detection result. The voltage detector generates the detection result by detecting a voltage on the second end of the first transistor. The discharging path generator provides a discharging path between the second end of the first transistor and a reference ground voltage according to the detection result.

17 Claims, 3 Drawing Sheets

POWER SUPPLY AND STARTUP CIRCUIT THEREOF

CROSS-REFERENCE TO RELATED APPLICATION

This application claims the priority benefit of Taiwan application serial no. 101219352, filed on Oct. 5, 2012. The entirety of the above-mentioned patent application is hereby incorporated by reference herein and made a part of this specification.

BACKGROUND OF THE INVENTION

1. Field of Invention

The invention relates to a startup circuit of a power supply. More particularly, the invention relates to a startup circuit that may provide a discharging path for an electromagnetic interference (EMI) filter in a power supply.

2. Description of Related Art

FIG. 1 illustrates circuitry of a conventional power supply. The power supply 100 includes capacitors C1, C2, and CO, a transformer L1, a resistor RD, and a bridge rectifier BR1. The capacitors C1 and C2 and an inductor of the transformer L1 in the power supply 100 together constitute an inductance/capacitance (LC) electromagnetic interference filter.

According to the structure of the power supply 100, after the power supply 100 stops receiving alternating current (AC) input power ACIN, the electromagnetic interference filter in the power supply 100 still stores a fixed amount of charges. To discharge the electromagnetic interference filter, the conventional power supply 100 is equipped with the resistor RD that is connected to the capacitor C1, so as to perform the discharging action. This resistor RD, however, also consumes power while the power supply 100 normally functions. In particular, when the power supply 100 is not loaded, the resistor RD is the main power consumption source of the power supply 100.

SUMMARY OF THE INVENTION

The invention is directed to a startup circuit that is capable of effectively detecting an input status of alternating current (AC) input power and timely providing a discharging path of electromagnetic interference (EMI).

The invention is also directed to a power supply of which a startup circuit effectively detects an input status of AC input power and timely provides a discharging path of EMI.

In an embodiment of the invention, a startup circuit suitable for a power supply is provided. The startup circuit receives AC input power from the power supply. The startup circuit includes a first transistor, a bias resistor, a pull-down switch, a voltage detector, and a discharging path generator. The first transistor has a first end, a second end, and a control end, and the first end of the first transistor receives the AC input power. The bias resistor is serially coupled between the second end and the control end of the first transistor. A first end of the pull-down switch is coupled to the control end of the first transistor, and a second end of the pull-down switch is coupled to a reference ground voltage. The pull-down switch is turned on or turned off according to a detection result. The voltage detector is coupled to the first transistor and the bias resistor and generates the detection result by detecting a voltage on the second end of the first transistor. The discharging path generator is coupled to the voltage detector, the first transistor, and the bias resistor. Here, the discharging path generator provides a discharging path between the second end of the first transistor and the reference ground voltage according to the detection result.

According to an embodiment of the invention, the first transistor is a depletion mode transistor or a junction field effect transistor.

According to an embodiment of the invention, the voltage detector generates the detection result by detecting whether the voltage on the second end of the first transistor is constantly greater than a reference voltage within a set time frame.

According to an embodiment of the invention, the voltage detector includes a first comparator and a watch-dog timer. The first comparator generates a comparison result by comparing the reference voltage with the voltage on the second end of the first transistor. The watch-dog timer is coupled to the first comparator. Here, the watch-dog timer receives the comparison result and a clock signal and generates the detection result according to the comparison result and the clock signal.

According to an embodiment of the invention, the watch-dog timer includes a one-shot circuit and at least one D flip-flop. The one-shot circuit receives the comparison result and generates a single-pulse signal according to the comparison result. The D flip-flop has a data end, a clock end, a reset end, and an output end. The data end of the D flip-flop receives a power voltage, the clock end of the D flip-flop receives the clock signal, the reset end of the D flip-flop receives the single-pulse signal, and the output end of the D flip-flop generates the detection result.

According to an embodiment of the invention, the startup circuit further includes a diode, a second comparator, and a logic operation circuit. An anode of the diode is coupled to the second end of the first transistor. One input end of the second comparator is coupled to a cathode of the diode, and the other input end of the second comparator receives a threshold voltage. The logic operation circuit is coupled to a path where the pull-down switch receives the detection result. One input end of the logic operation circuit receives the detection result, the other input end of the logic operation circuit is coupled to an output end of the second comparator, and an output end of the logic operation circuit is coupled to the pull-down switch.

According to an embodiment of the invention, the pull-down switch is a second transistor. The second transistor has a first end, a second end, and a control end. The first end of the second transistor is coupled to the second end of the first transistor, the control end of the second transistor receives the detection result, and the second end of the second transistor is coupled to the reference ground voltage.

In an embodiment of the invention, a power supply that includes a capacitor, a bridge rectifier, a diode pair, and a startup circuit is provided. The capacitor is serially connected between a first input end and a second input end, and the first and second input ends receive an AC input voltage. The bridge rectifier is coupled to the first and second input ends and generates an AC output voltage. Anodes of the diode pair are respectively coupled to the first and second input ends. The startup circuit is coupled to cathodes of the diode pair to receive AC input power, and the startup circuit includes a first transistor, a bias resistor, a pull-down switch, a voltage detector, and a discharging path generator. The first transistor has a first end, a second end, and a control end, and the first end of the first transistor receives the AC input power. The bias resistor is serially coupled between the second end and the control end of the first transistor. A first end of the pull-down switch is coupled to the control end of the first transistor, and a second end of the pull-down switch is coupled to a reference ground voltage. The pull-down switch is turned on or turned off according to a detection result. The voltage detector is coupled to the first transistor and the bias resistor and generates the detection result by detecting a voltage on the second end of the first transistor. The discharging path generator is coupled to the voltage detector, the first transistor, and the bias resistor. Here, the discharging path generator provides a discharging path between the second end of the first transistor and the reference ground voltage according to the detection result.

In view of the above, the first transistor and the bias resistor serially connected between the control end and the second end of the first transistor together constitute the channel, so as to provide the voltage detector with the signal received by the first end of the first transistor. Thereby, the voltage detector is allowed to detect whether the AC input power is input or not. In the event that the AC input power is not input to the startup circuit, the discharging path generator provides a discharging path between the second end of the first transistor and the reference ground voltage, such that the electromagnetic interference filter in the power supply may perform the discharging action.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
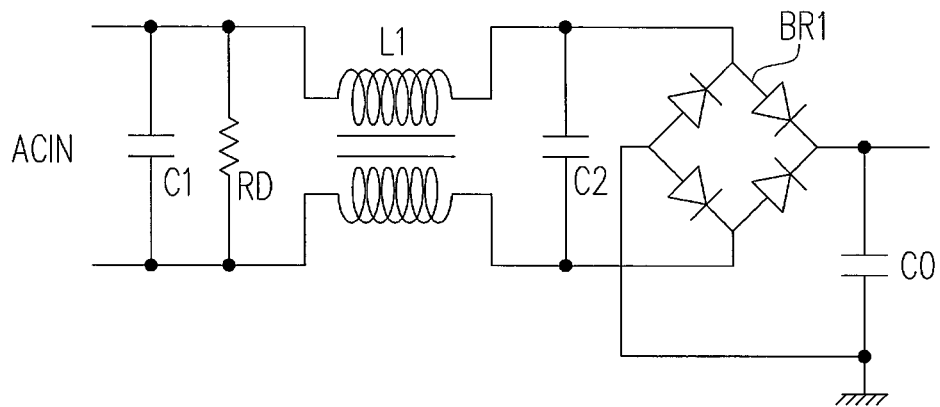
FIG. 1 illustrates circuitry of a conventional power supply.
Figure 2:
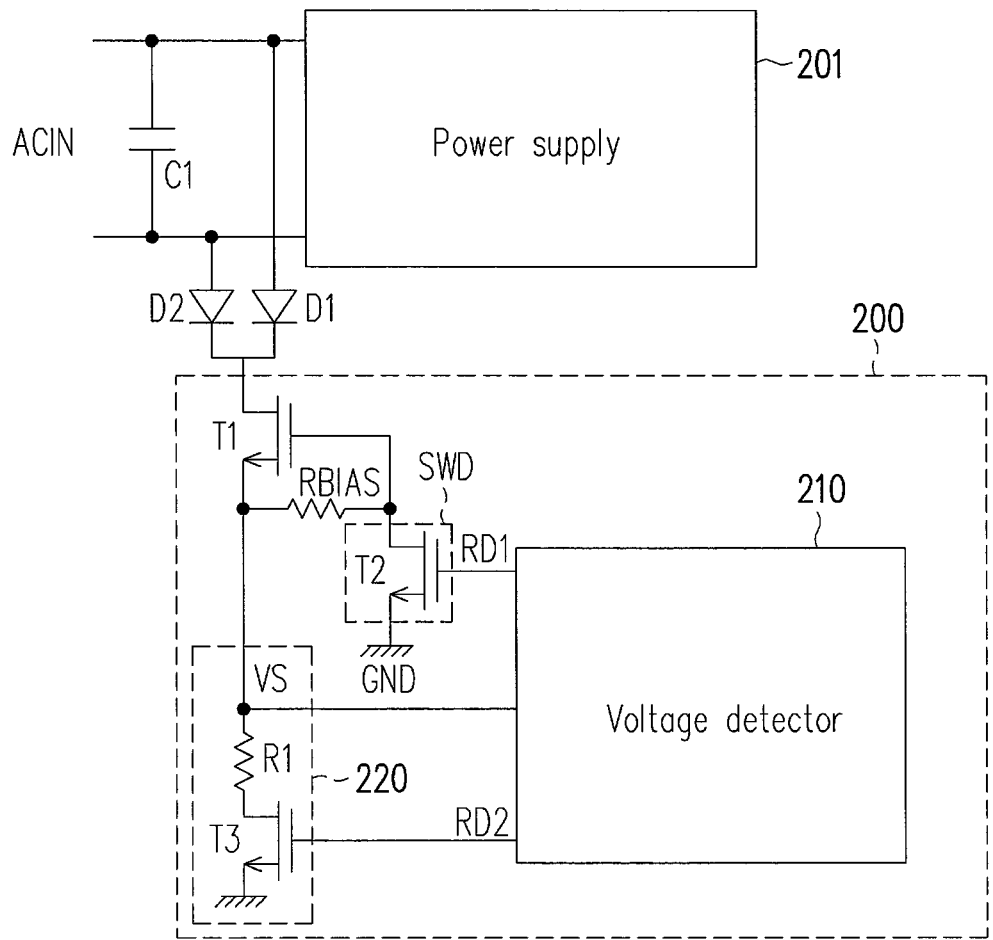
FIG. 2 is a schematic view illustrating a startup circuit according to an embodiment of the invention.

FIG. 2 is a schematic view illustrating a startup circuit according to an embodiment of the invention. The startup circuit 200 is suitable for a power supply 201 and is coupled to the power supply 201. Besides, the startup circuit 200 receives alternating current (AC) input power ACIN from the power supply 201 through diodes D1 and D2. Through the rectifying effects achieved by the diodes D1 and D2, the startup circuit 200 is able to receive parts of the AC input power ACIN greater than a reference ground voltage GND. In particular, the startup circuit 200 is able to receive parts of the AC input power ACIN greater than a turned-on threshold voltage of the diodes D1 and D2.

The startup circuit 200 includes a transistor T1, a bias resistor RBIAS, a pull-down switch SWD, a voltage detector 210, and a discharging path generator 220. A first end (e.g., the drain) of the transistor T1 receives the AC input power ACIN through the diodes D1 and D2, and the bias resistor RBIAS is serially coupled between a second end (e.g., the source) and a control end (e.g., the gate) of the transistor T1. The pull-down switch SWD is coupled between the control end of the transistor T1 and the reference ground voltage GND. Here, the pull-down switch SWD is turned on or turned off according to a detection result RD1. The voltage detector 210 is coupled to the transistor T1 and the bias resistor RBIAS and generates the detection result RD1 by detecting a voltage VS on the second end of the transistor T1. The discharging path generator 220 is coupled to the voltage detector 210, the transistor T1, and the bias resistor RBIAS. According to the detection result RD1, the discharging path generator 220 provides a discharging path between the second end of the transistor T1 and the reference ground voltage GND.

To be specific, in a default state, the pull-down switch SWD is turned on according to the detection result RD1 received by the pull-down switch SWD, and the voltage received by the control end of the transistor T1 is pulled down to be equal to the reference ground voltage GND. At this time, the transistor T1 is partially turned on, and the voltage VS on the second end of the transistor T1 causes the current flowing through the transistor T1 to equal a quotient obtained by dividing the voltage VS by the resistance of the bias resistor RBIAS. The voltage VS on the second end of the transistor T1 may be changed according to the AC input power ACIN, and the voltage detector 210 generates a varying detection result RD1 by detecting the changes to the voltage VS on the second end of the transistor T1. Here, the voltage detector 210 generates the detection result RD1 by comparing the voltage VS on the second end of the transistor T1 with a reference voltage. The voltage detector 210 may generate the detection result RD1 by detecting whether the voltage VS on the second end of the transistor T1 is constantly greater than the reference voltage within a set time frame.

Note that the transistor T1 is a depletion mode transistor or a junction field effect transistor.

Besides, the pull-down switch SWD is constituted by a transistor T2. A first end of the transistor T2 is coupled to the control end of the transistor T1; alternatively, the first end of the transistor T2 is coupled to the second end of the transistor T1 through the bias resistor RBIAS. A control end of the transistor T2 receives the detection result RD1, and a second end of the transistor T2 is coupled to the reference ground voltage GND.

The voltage VS on the second end of the transistor T1 is changed together with the AC input power ACIN; hence, when the AC input power ACIN is stopped from being input to the power supply 201, the voltage VS on the second end of the transistor T1 stops to change and stays at a relatively high voltage level. Thereby, the voltage detector 210 may determine whether the AC input power ACIN is stopped from being input to the power supply 201 and may correspondingly generate the detection result RD2 by detecting whether the voltage VS on the second end of the transistor T1 is constantly greater than the reference voltage within a set time frame.

As long as the voltage detector 210 determines that the AC input power ACIN is stopped from being input to the power supply 201, the detection result RD2 correspondingly generated by the voltage detector 210 may allow the discharging path generator 220 to provide a discharging path between the second end of the transistor T1 and the reference ground voltage GND. In the present embodiment, the detection results RD1 and RD2 are logic signals at opposite logic levels.

The discharging path generator 220 includes a resistor R1 and a transistor T3. A first end of the resistor R1 is coupled to the second end of the transistor T1, and a second end of the resistor is coupled to a first end of the transistor T3. The second end of the transistor T3 is coupled to the reference ground voltage GND, and the control end of the transistor T3 receives the detection result RD2. When the transistor T3 is turned on according to the detection result RD2 received by the transistor T3, the transistor T2 is turned off according to the detection result RD1. At this time, the transistor T1 may be in an effective ON state, and the charges in the storage capacitor C1 may be discharged through the discharging path provided by the discharging path generator 220.

As long as the AC input power ACIN is continuously provided to the power supply 201, the transistor T3 is not turned on. Therefore, the startup circuit 200 has small current bias with the bias resistor Rbias and the transistor T2, and thus there is very small power loss in the startup circuit 200. Given that the AC input power ACIN is stopped from being supplied to the power supply 201, the discharging path generator 220 in the startup circuit 200 effectively provides a discharging path for the electromagnetic interference filter in the power supply 201 to perform the discharging action.

Figure 3A:
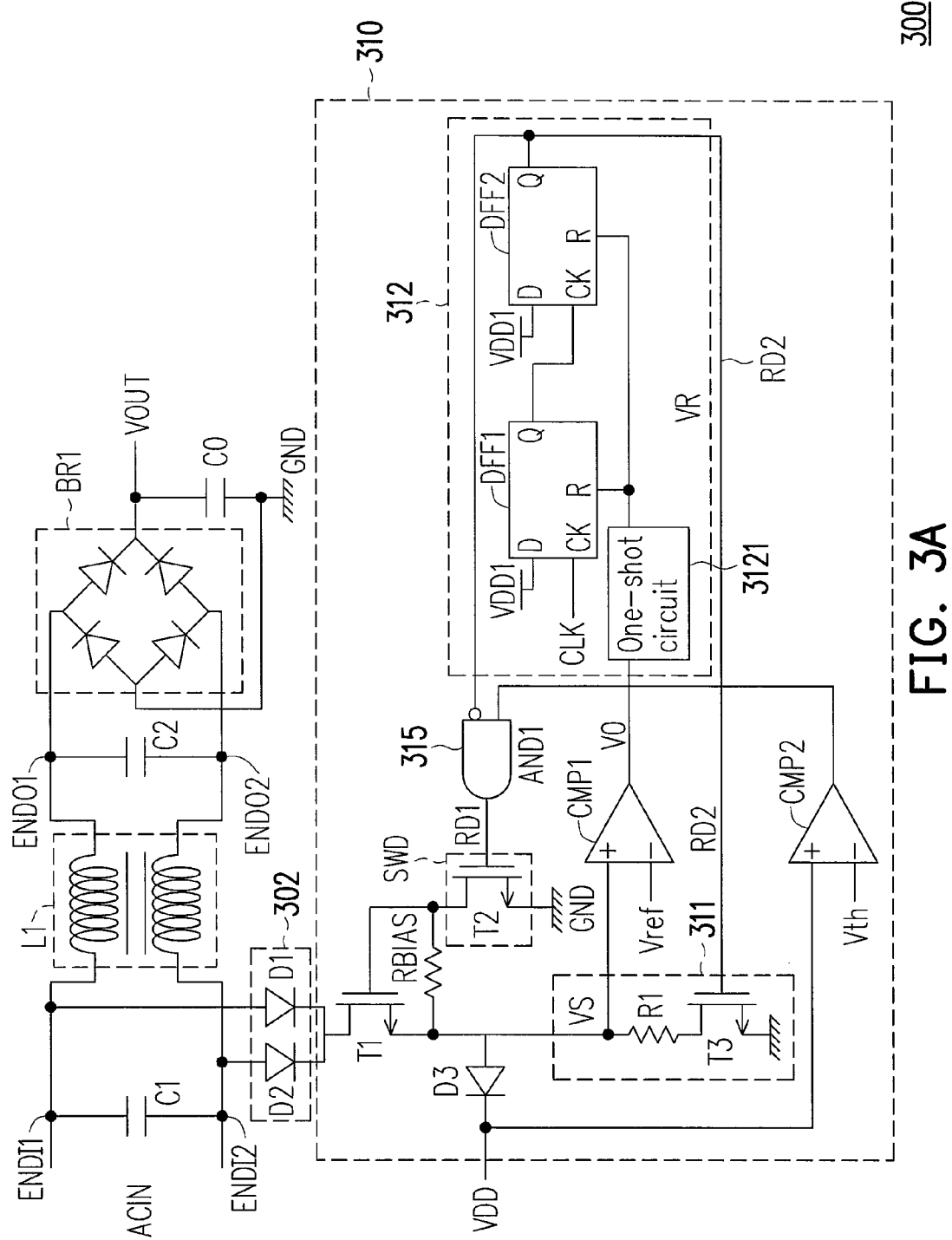
FIG. 3A is a schematic view illustrating a power supply according to an embodiment of the invention.

FIG. 3A is a schematic view illustrating a power supply according to an embodiment of the invention. The power supply 300 includes capacitors C1, C2, and C0, a transformer L1, a bridge rectifier BR1, a diode pair 302, and a startup circuit 310. The capacitor C1 is serially connected between a first input end ENDI1 and a second input end ENDI2, and the first and second input ends ENDI1 and ENDI2 receive an AC input voltage ACIN. A first end of the transformer L1 is coupled between the first input end ENDI1 and a first output end ENDO1, and a second end of the transformer L1 is coupled between the second input end ENDI2 and a second output end ENDO2. The bridge rectifier BR1 is coupled to the first and second input ends ENDO1 and ENDO2 and generates an AC output voltage VOUT. The diode pair 302 includes diodes D1 and D2. Anodes of the diodes D1 and D2 are respectively coupled to the first and second input ends ENDI1 and ENDI2, and cathodes of the diodes D1 and D2 are coupled to the startup circuit 310 to transmit parts of the AC input voltage ACIN greater than the turned-on threshold voltages of the diodes D1 and D2. Besides, the capacitor C0 is serially connected between the output end of the power supply 300 and the reference ground voltage GND and serves as a voltage regulating capacitor.

Figure 3B:
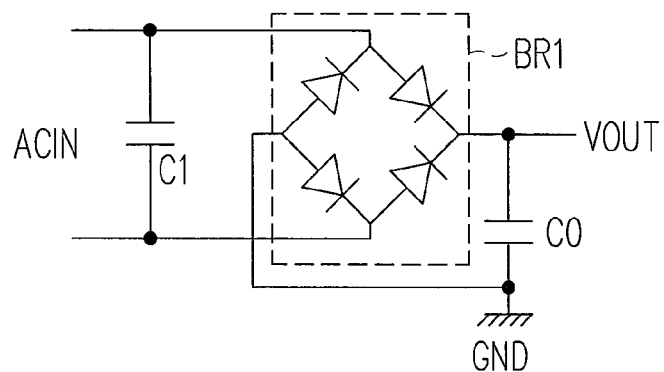
FIG. 3B is a schematic view illustrating parts of circuitry of a power supply according to an embodiment of the invention.

Note that the transformer L1 and the capacitor C2 of the power supply 300 as shown in FIG. 3A are not necessary components. According to the present embodiment, the AC input power ACIN may be directly provided to the input end of the bridge rectifier BR1, and the capacitor C1 may be cross-coupled between two input ends of the bridge rectifier BR1. The circuitry of the bridge rectifier BR1 is shown in FIG. 3B which is a schematic view illustrating parts of circuitry of a power supply according to an embodiment of the invention With reference to FIG. 3A, unlike the startup circuit 200, the startup circuit 310 further includes a diode D3, a comparator CMP2, and a logic operation circuit 315. An anode of the diode D3 is coupled to the second end of the transistor T1. One input end of the comparator CMP2 is coupled to a cathode of the diode D3, and the other input end of the comparator CMP2 receives a threshold voltage Vth. The logic operation circuit 315 is coupled to a path where the pull-down switch SWD receives the detection result RD2. One input end of the logic operation circuit 315 receives the detection result RD2, the other input end of the logic operation circuit 315 is coupled to an output end of the comparator CMP2, and an output end of the logic operation circuit 315 is coupled to the pull-down switch SWD.

The diode D3, the comparator CMP2, and the logic operation circuit 315 are employed to determine whether the AC input power ACIN is located in a startup range, i.e., a range where the voltage of the AC input power ACIN gradually increases but has not increased to a sufficiently high voltage level (greater than the reference voltage). Here, a voltage VDD generated by the diode D3 is transmitted to one input end of the comparator CMP2, and the comparator CMP2 compares the reference voltage Vth and the voltage VDD and transmits the comparison result to the logic operation circuit 315. For instance, if the voltage VDD is smaller than the reference voltage Vth, the comparator CMP2 transmits a logic low level comparison result to the logic operation circuit 315 that has an AND gate AND1 with an inverting input end, such that the logic operation circuit 315 generates the detection result RD1 which is equal to the logic low level. By contrast, For instance, if the voltage VDD is raised to be greater than the reference voltage Vth, the comparator CMP2 transmits a logic high level comparison result to the logic operation circuit 315 that has an AND gate AND1 with an inverting input end, such that the logic operation circuit 315 generates the detection result RD1 that is determined by the voltage detector. Here, the voltage detector is constituted by the comparator CMP1 and the watch-dog timer 312.

It should be mentioned that the AND gate AND1 is coupled to an end of the watch-dog timer 312, and the end of the watch-dog timer 312 coupled to the AND gate AND1 is an inverting input end. That is, the AND gate AND1 receives the output of the comparator CMP2 and the inverting output of the watch-dog timer 312 and thereby performs the logic operation, so as to generate the detection result RD1.

The comparator CMP1 generates a comparison result Vo by comparing the reference voltage Vref with the voltage VS on the second end of the transistor T1. The comparison result Vo is transmitted to the watch-dog timer 312. The watch-dog timer 312 also receives a clock signal CLK and generates the detection result RD2 according to the comparison result Vo and the clock signal CLK.

Here, the watch-dog timer 312 includes a one-shot circuit 3121 and at least one D flip-flop DFF1~DFF2. The one-shot circuit 3121 receives the comparison result Vo and generates a single-pulse signal VR according to a transition point of the comparison result Vo. Each D flip-flop has a data end D, a clock end CK, a reset end R, and an output end Q. In the exemplary D flip-flop DFF1, the data end D of the D flip-flop DFF1 receives a power voltage VDD1, the clock end CK of the D flip-flop DFF1 receives the clock signal CLK, and the reset end R of the D flip-flop DFF1 receives the single-pulse signal VR. An output end of the last-level D flip-flop DFF2 generates the detection result RD2.

When the comparator CMP1 continuously compares the voltage VS on the second end of the transistor T1 with the reference voltage Vref and determines that the voltage VS on the second end of the transistor T1 is continuously smaller than the reference voltage Vref, the watch-dog timer 312 correspondingly allows the one-shot circuit 3121 to continuously generate the single-pulse signal VR to reset the D flip-flops DFF1 and DFF2. Thereby, the detection result RD2 stays at the logic low level. On the contrary, if the comparator CMP1 continuously compares the voltage VS on the second end of the transistor T1 with the reference voltage Vref and determines that the voltage VS on the second end of the transistor T1 is continuously greater than the reference voltage Vref within a set time frame Ts, the watch-dog timer 312 correspondingly allows the one-shot circuit 3121 to stop generating the single-pulse signal VR. Thereby, the detection result RD2 is changed to be at the logic high level.

The set time frame Ts may be determined by the cycle Tclk of the clock signal CLK and the number N of the D flip-flops. Here, Ts=Tclk×N.

Figure 4:
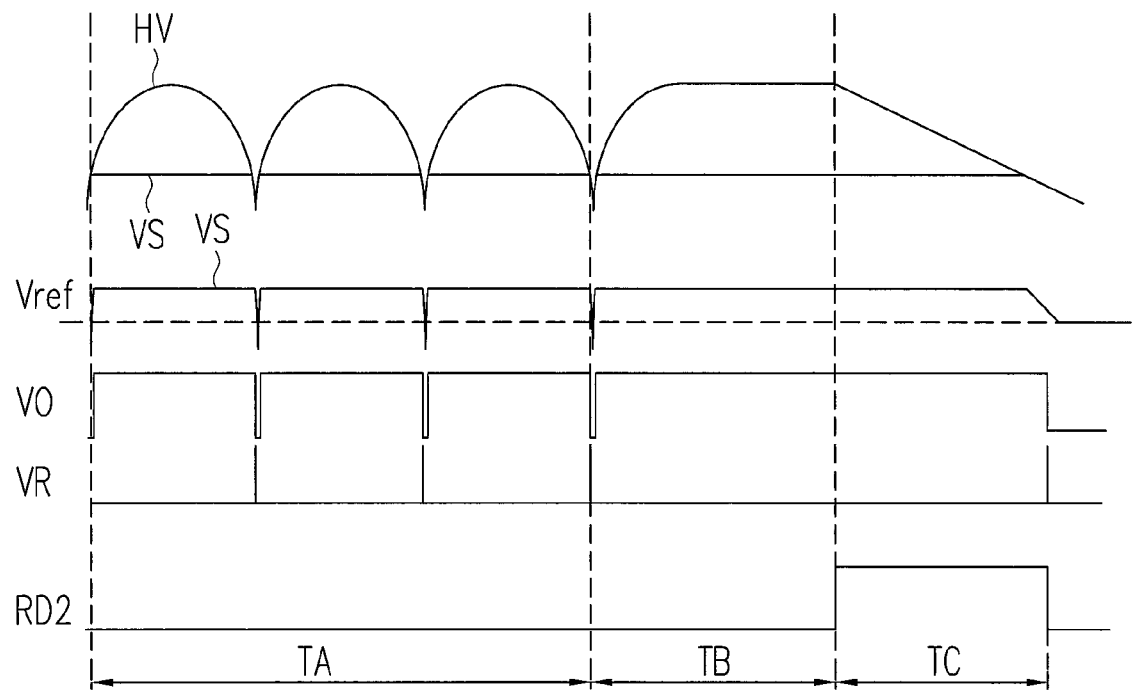
FIG. 4 illustrates operational waveforms according to an embodiment of the invention.

FIG. 4 illustrates operational waveforms according to an embodiment of the invention. With reference to FIG. 3A, FIG.

3B, and FIG. 4, the first end of the transistor T1 receives a voltage HV, and the voltage VS is generated on the second end of the transistor T1. Within a time frame TA, the AC input power ACIN is continuously input, the single-pulse signal VR is continuously generated, and the detection result RD2 stays at the logic low level. After the time period TA, the input of the AC input power ACIN is stopped, and if the voltage detector determines that the voltage VS on the second end of the transistor T1 is continuously greater than the reference voltage Vref within a time frame TB (equal to the set time frame), the single-pulse signal VR is stopped from being generated. In a time frame TC following the time frame TB, the detection result RD2 is transformed into the logic low level, such that the discharging path generator provides the discharging path for the electromagnetic interference filter in the power supply.

To sum up, the invention is directed to a startup circuit as described above. In the startup circuit, whether the AC input power is input to the power supply is detected. If the AC input power is continuously input to the power supply, no discharging path is provided for the electromagnetic interference filter; as long as the AC input power is stopped from being input to the power supply, the discharging path is effectively provided for the electromagnetic interference filter. Thereby, the power supply may not have unnecessary power consumption because no discharging path for the electromagnetic interference filter is provided when the power supply normally functions. As such, the efficiency of the power supply may be effectively improved.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A startup circuit, suitable for a power supply, the startup circuit receiving alternating current input power from the power supply, comprising:
   a first transistor having a first end, a second end, and a control end, the first end of the first transistor receiving the alternating current input power;
   a bias resistor serially coupled between the second end and the control end of the first transistor;
   a pull-down switch, a first end of the pull-down switch being coupled to the control end of the first transistor, a second end of the pull-down switch being coupled to a reference ground voltage, the pull-down switch being turned on or turned off according to a detection result;
   a voltage detector coupled to the first transistor and the bias resistor, the voltage detector generating the detection result by detecting a voltage on the second end of the first transistor; and
   a discharging path generator coupled to the voltage detector, the first transistor, and the bias resistor, the discharging path generator providing a discharging path between the second end of the first transistor and the reference ground voltage according to the detection result.

2. The startup circuit as recited in claim 1, wherein the first transistor is a depletion mode transistor or a junction field effect transistor.

3. The startup circuit as recited in claim 1, wherein the voltage detector generates the detection result by detecting whether the voltage on the second end of the first transistor is constantly greater than a reference voltage within a set time frame.

4. The startup circuit as recited in claim 3, wherein the voltage detector comprises:
   a first comparator, generating a comparison result by comparing the reference voltage with the voltage on the second end of the first transistor; and
   a watch-dog timer, coupled to the first comparator, the watch-dog timer receiving the comparison result and a clock signal and generating the detection result according to the comparison result and the clock signal.

5. The startup circuit as recited in claim 4, wherein the watch-dog timer comprises:
   a one-shot circuit receiving the comparison result and generating a single-pulse signal according to the comparison result; and
   at least one D flip-flop, having a data end, a clock end, a reset end, and an output end, wherein the data end of the at least one D flip-flop receives a power voltage, the clock end of the at least one D flip-flop receives the clock signal, the reset end of the at least one D flip-flop receives the single-pulse signal, and the output end of the at least one D flip-flop generates the detection result.

6. The startup circuit as recited in claim 4, further comprising:
   a diode, an anode of the diode being coupled to the second end of the first transistor;
   a second comparator, one input end of the second comparator being coupled to a cathode of the diode, the other input end of the second comparator receiving a threshold voltage; and
   a logic operation circuit coupled to a path where the pull-down switch receives the detection result, one input end of the logic operation circuit receiving the detection result, the other input end of the logic operation circuit being coupled to an output end of the second comparator, an output end of the logic operation circuit being coupled to the pull-down switch.

7. The startup circuit as recited in claim 1, wherein the pull-down switch is a second transistor having a first end, a second end, and a control end, the first end of the second transistor is coupled to the control end of the first transistor, the control end of the second transistor receives the detection result, and the second end of the second transistor is coupled to the reference ground voltage.

8. The startup circuit as recited in claim 1, wherein the discharging path generator comprises:
   a resistor, a first end of the resistor being coupled to the second end of the first transistor; and
   a second transistor having a first end, a second end, and a control end, wherein the first end of the second transistor is coupled to a second end of the resistor, the second end of the second transistor is coupled to the reference ground voltage, and the control end of the second transistor receives the detection result.

9. A power supply comprising:
   a capacitor serially connected between a first input end and a second input end, the first and second input ends receiving an alternating current input voltage;
   a bridge rectifier coupled to the first and second input ends, the bridge rectifier generating an alternating current output voltage;
   a diode pair, anodes of the diode pair being respectively coupled to the first and second input ends; and
   a startup circuit coupled to cathodes of the diode pair to receive alternating current input power, the startup circuit comprising:

a first transistor having a first end, a second end, and a control end, the first end of the first transistor receiving the alternating current input power;

a bias resistor serially coupled between the second end and the control end of the first transistor;

a pull-down switch, a first end of the pull-down switch being coupled to the control end of the first transistor, a second end of the pull-down switch being coupled to a reference ground voltage, the pull-down switch being turned on or turned off according to a detection result;

a voltage detector coupled to the first transistor and the bias resistor, the voltage detector generating the detection result by detecting a voltage on the second end of the first transistor; and a discharging path generator coupled to the voltage detector, the first transistor, and the bias resistor, the discharging path generator providing a discharging path between the second end of the first transistor and the reference ground voltage according to the detection result.

10. The power supply as recited in claim 9, further comprising:

a transformer serially connected to a path where the bridge rectifier receives the alternating current input voltage, a first end of the transformer being coupled between the first input end and a first output end, a second end of the transformer being coupled between the second input end and a second output end.

11. The power supply as recited in claim 9, wherein the first transistor is a depletion mode first transistor or a junction field effect first transistor.

12. The power supply as recited in claim 9, wherein the voltage detector generates the detection result by detecting whether the voltage on the second end of the first transistor is constantly greater than a reference voltage within a set time frame.

13. The power supply as recited in claim 12, wherein the voltage detector comprises:

a first comparator generating a comparison result by comparing the reference voltage with the voltage on the second end of the first transistor; and a watch-dog timer coupled to the first comparator, the watch-dog timer receiving the comparison result and a clock signal and generating the detection result according to the comparison result and the clock signal.

14. The power supply as recited in claim 13, wherein the watch-dog timer comprises:

a one-shot circuit receiving the comparison result and generating a single-pulse signal according to the comparison result; and at least one D flip-flop having a data end, a clock end, a reset end, and an output end, wherein the data end of the at least one D flip-flop receives a power voltage, the clock end of the at least one D flip-flop receives the clock signal, the reset end of the at least one D flip-flop receives the single-pulse signal, and the output end of the at least one D flip-flop generates the detection result.

15. The power supply as recited in claim 13, wherein the startup circuit further comprises:

a diode, an anode of the diode being coupled to the second end of the first transistor;

a second comparator, one input end of the second comparator being coupled to a cathode of the diode, the other input end of the second comparator receiving a threshold voltage; and a logic operation circuit coupled to a path where the pull-down switch receives the detection result, one input end of the logic operation circuit receiving the detection result, the other input end of the logic operation circuit being coupled to an output end of the second comparator, an output end of the logic operation circuit being coupled to the pull-down switch.

16. The power supply as recited in claim 9, wherein the pull-down switch is a second transistor having a first end, a second end, and a control end, the first end of the second transistor is coupled to the second end of the first transistor, the control end of the second transistor receives the detection result, and the second end of the second transistor is coupled to the reference ground voltage.

17. The power supply as recited in claim 9, wherein the discharging path generator comprises:

a resistor, wherein a first end of the resistor is coupled to the second end of the first transistor; and a second transistor having a first end, a second end, and a control end, wherein the first end of the second transistor is coupled to a second end of the resistor, the second end of the second transistor is coupled to the reference ground voltage, and the control end of the second transistor receives the detection result.

* * * * *